United States Patent [19]

Henriksson et al.

[11] Patent Number: 5,899,398
[45] Date of Patent: May 4, 1999

[54] METHOD FOR MAKING A FRAME FOR FISHING REELS OF THE MULTIPLIER TYPE

[75] Inventors: Bengt-Åke Henriksson, Svängsta; Börje Moosberg, Mörrum, both of Sweden

[73] Assignee: ABU AB, Svängsta, Sweden

[21] Appl. No.: 08/896,977

[22] Filed: Jul. 18, 1997

Related U.S. Application Data

[63] Continuation of application No. 08/414,222, Mar. 31, 1995, abandoned.

[51] Int. Cl.[6] .................................................. A01K 89/015
[52] U.S. Cl. ................................................................ 242/310
[58] Field of Search ..................................... 242/310, 311, 242/312, 313

[56] References Cited

U.S. PATENT DOCUMENTS

| 4,481,748 | 11/1984 | D'Alessio et al. ..................... 52/638 |
| 4,658,487 | 4/1987 | Gachot . |
| 4,939,828 | 7/1990 | Maier . |
| 5,398,411 | 3/1995 | Kusaka et al. . |
| 5,480,102 | 1/1996 | Sato . |
| 5,613,645 | 3/1997 | Carpenter et al. . |
| 5,655,723 | 8/1997 | Moosberg . |

FOREIGN PATENT DOCUMENTS 5-161911  6/1993  Japan .

*Primary Examiner*—Donald P. Walsh
*Assistant Examiner*—Emmanuel M. Marcelo
*Attorney, Agent, or Firm*—Browdy and Neimark

[57] ABSTRACT

In the making of a frame for a fishing reel of the multiplier type, a tubular aluminum section is produced by extrusion. The aluminum section is cut to length corresponding to the width of the frame to be made, this length being thereafter processed to form a frame.

4 Claims, 2 Drawing Sheets

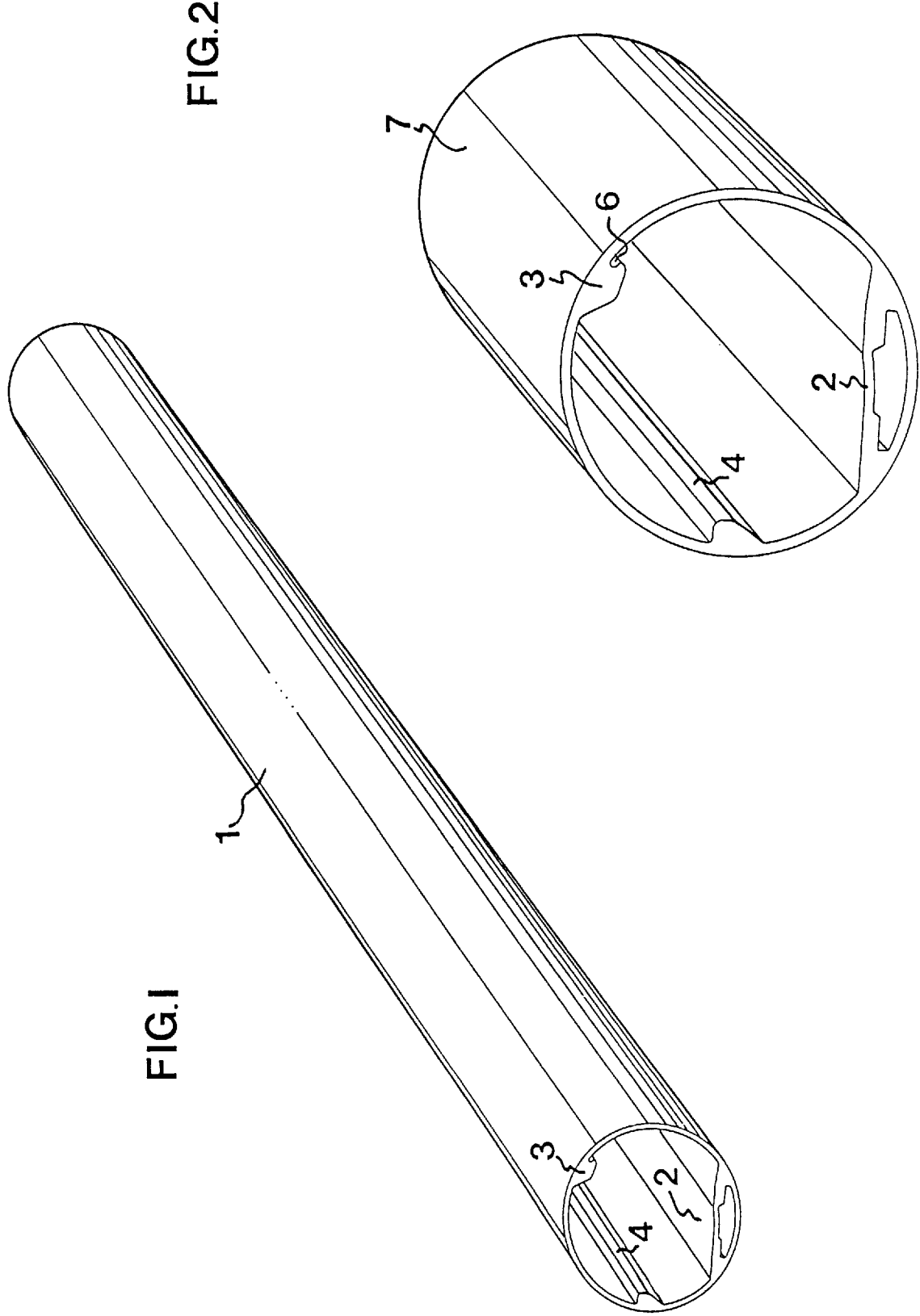

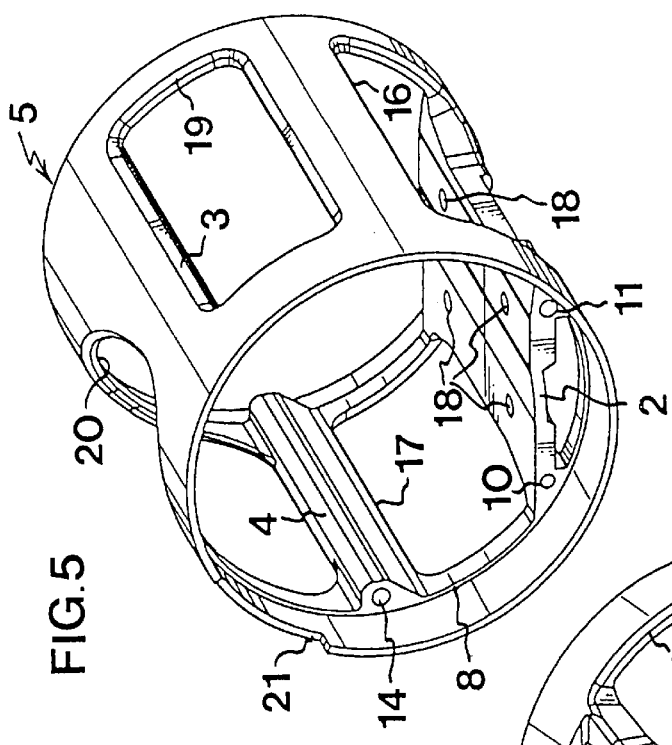
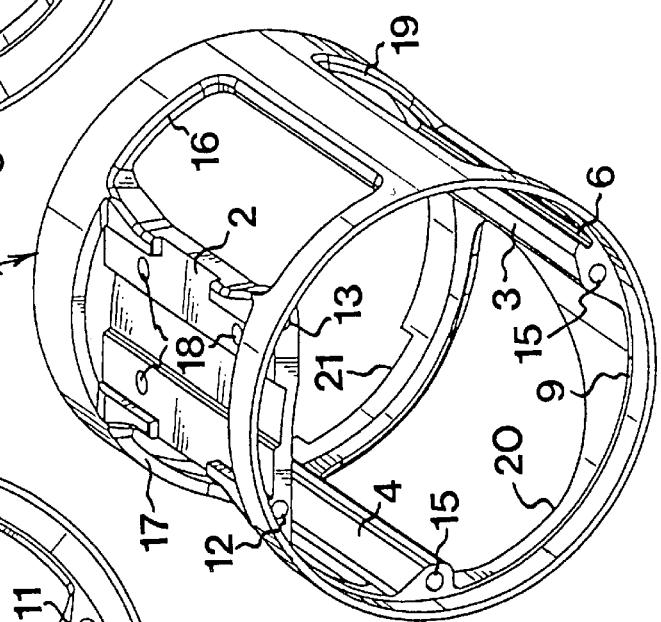
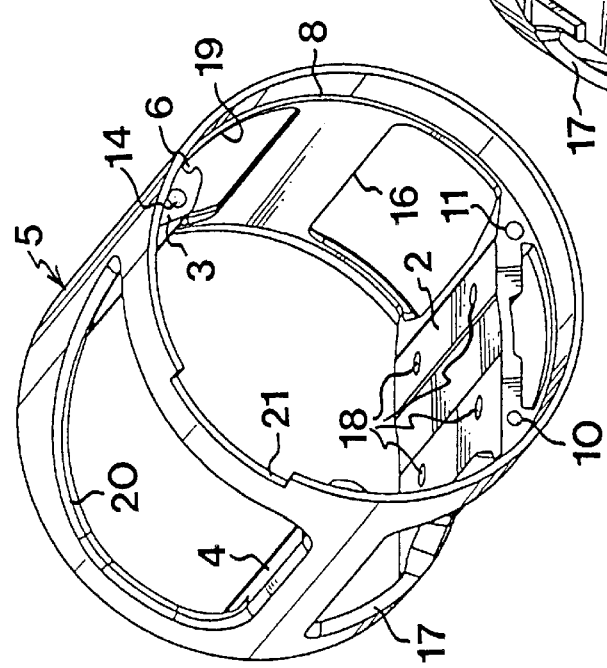

METHOD FOR MAKING A FRAME FOR FISHING REELS OF THE MULTIPLIER TYPE

This application is a continuation of application Ser. No. 08/414,222, filed Mar. 31, 1995, now abandoned.

BACKGROUND OF THE INVENTION

The present invention relates to a method for producing a blank for making a frame for a fishing reel of the multiplier type, a method for making such a frame, and a blank and a frame made according to the respective methods.

Frames for fishing reels of the multiplier type are today often manufactured from aluminum. In a known manufacturing method, the frame or a blank for making the frame is die-cast in a mould, with a radially extending wall which becomes an inner frame plate. To enable die-casting, the aluminum must be brought to liquid state, to which end different substances, such as silicon, and alloys are added. In this context, these substances and alloys may be regarded as impurities, since they have an adverse effect on the subsequent surface-treatment and coloring of the frame or frame blank. In fact, they tend to give rise to discolored spots on the surface of the frame or frame blank.

SUMMARY OF THE INVENTION

The object of the present invention is to provide a method for producing a blank for making a frame for a fishing reel of the multiplier type, and a method for making such a frame, each of these methods overcoming the drawback mentioned above.

To this end, there is provided according to the invention a method for producing a blank for making a frame for a fishing reel of the multiplier type, comprising the steps of producing a substantially tubular aluminum section by extrusion, and cutting from said aluminum section a length corresponding to the width of the frame to be made.

To this same end, there is also provided according to the invention a method for making a frame for a fishing reel of the multiplier type, comprising the steps of producing a substantially tubular aluminum section by extrusion, cutting from said aluminum section a length corresponding to the width of the frame to be made, and processing said length to form a frame.

BRIEF DESCRIPTION OF THE DRAWINGS

The invention will now be described in more detail with reference to the accompanying drawings, in which:

FIG. 1 is a perspective view showing an extruded aluminum section;

FIG. 2 is a perspective view showing a length cut from the aluminum section shown in FIG. 1;

FIG. 3 is a perspective view showing a fishing-reel frame which is made from the section length shown in FIG. 2, and of which the right side, the top side and the rear side are visible;

FIG. 4 is a perspective view showing the left side, the bottom side and the front side of the frame in FIG. 3; and FIG. 5 is a perspective view showing the right side, the top side and the front side of the frame in FIGS. 3 and 4.

DESCRIPTION OF THE PREFERRED EMBODIMENT

According to the invention, an aluminum section 1 is produced by extrusion. The extruded aluminum section 1 contains no additives/impurities, since these are not required in extrusion (compare the die-casting described above).

In the illustrated embodiment, the aluminum section 1 has substantially the shape of a circular-cylindrical tube. In cross-section, the aluminum section 1 has a chord-like, horizontal bridge 2 in its lower portion, and inwardly-projecting first rib 3 approximately at one o'clock in FIG. 2, and an inwardly-projecting rib 4 approximately at nine o'clock in FIG. 2. The horizontal bridge 2 is to form a transverse brace in the frame 5 (FIGS. 3–5) to be made. This brace forms a fixing plate for a conventional foot member (not shown), by means of which a fishing reel (not shown) of the multiplier type produced by means of the frame 5 can be fixed on a fishing rod (not shown). The first rib 3 is to form a transverse brace located in the upper part of the front portion of the frame 5. In its lower part, the first rib 3 is formed with a groove 6, which is to form a guide groove for the line-guiding eye of a conventional level-wind mechanism (not shown) mounted in the finished fishing reel. The second rib 4 is to form a transverse brace which is located in the rear portion of the frame 5 and is to act as a thumbrest in the finished fishing reel.

It should be noted that the terms "front", "rear", "upper" and "lower" as used above and in the following relate to the position which the fishing reel occupies when it is mounted on a fishing rod held in a normal position of use during fishing.

From the aluminum section 1 a length 7 is cut corresponding to the width of the frame 5 to be made. The length 7 serves as a blank, open at both ends, for making the frame 5. The blank thus has an upstream end and a downstream end corresponding to opposite sides of the fishing reel frame 5, the upstream end and the downstream end both being open and having an interior periphery corresponding to the interior of the blank, i.e. the blank has no radial wall which will become the inner frame plate.

The cut section length or blank 7 is processed in one or more multioperation machines, in which the following operations are carried out.

The two end surfaces of the blank 7 are faced. The blank 7 is turned at each end some distance into the blank in such a manner that the bridge 2 and the ribs 3 and 4 terminate a certain distance inwardly of each end of the blank 7 and that the tube shell is slightly thinner in the turned end portions of the blank 7 than in its intermediate portion, a circumferential respective shoulder 8 and 9 being formed where the bridge 2 and the ribs 3 and 4 terminate. The turned portion at the right-hand side, with respect to the position of use described above, is slightly deeper in the axial direction than the turned portion at the left-hand side. Two axial holes 10, 11 and 12, 13 are bored in the bridge 2 at its right and left ends, respectively. The holes 11 and 13 of each pair of holes 10, 11 and 12, 13, respectively, are threaded. An axial hole 14 is bored in each of the ribs 3 and 4 at their right end, and an axial hole 15 is bored in each of the ribs 3 and 4 at their left end. The four holes 14 and 15 are threaded. The above-mentioned intermediate portion of the tube shell is milled radially outwardly of the bridge 2 and a certain distance on each side (as seen in the circumferential direction) of the bridge, such that it is freed and a substantially rectangular, front, lower opening 16 and a substantially rectangular, rear, lower opening 17 are formed in the tube shell in the above-mentioned intermediate portion thereof. Four throughgoing rivet holes 18 for fixing the foot member are bored in the bridge 2. The above-mentioned intermediate portion of the tube shell is milled at some distance from the front, lower opening 16 to form a substantially rectangular, front, upper opening 19. Said intermediate portion of the tube shell is milled at some distance from the rear, lower opening 17 to form a rear, upper opening 20, which is considerably larger than the rectangular openings 16, 17 and 19, which are substantially equally large. The opening 20 is defined at its right-hand side by a tube-shell edge directed in the circumferential direction, and in its lower portion by an axially directed tube-shell edge, while it is defined to the left and forwards by a tube-shell edge extending substantially arcuately between the left end of the axially directed tube-shell edge and the front end of the circumferentially directed tube-shell edge. A recess 21 is milled at the right end edge of the tube shell approximately opposite (as seen in the circumferential direction) to the rear, upper opening 20.

The processing is ended by grinding the frame and polishing it, either mechanically or electrolytically, and by finally surface-treating it by anodizing. Thus, the frame is finished.

As will have been understood from the above, no new tools are required according to the invention for changing the width of the frame in order to adapt it to the desired fishing-reel width. A new frame width is achieved quite simply by cutting from the extruded aluminum section a length corresponding to that width. In the die-casting process described in the introductory part, a separate mould is required for each desired frame width, this complicating and making the manufacturing process more expensive.

What we claim and desire to secure by Letters Patent is:

1. A frame for a fishing reel of the multiplier type, said frame comprising
    a blank in the form of a cut length of an extruded aluminum section, said cut length corresponding to the width of the frame, and having no inner frame plate, wherein the cut length further has a drilled, threaded, milled and turned structure.

2. A frame according to claim 1 wherein the cut length has an anodized surface.

3. An extruded aluminum frame for a fishing reel of the multiplier type, said frame having an inner wall and an outer wall, and exhibiting:
    a first transverse brace extending inwardly from said inner wall, suitable for a fixing plate for a foot member;
    a grooved rib spaced from said first transverse brace and extending inwardly from said inner wall, suitable as a guide groove for a level wind mechanism; and
    a second transverse brace spaced from said grooved rib and from said first transverse brace, and extending inwardly from said inner wall, suitable as a thumbrest;
    wherein said frame is a piece cut to length from an aluminum extrudate and has surfaces suitable for anodizing, said length corresponding to the width of said fishing reel.

4. A blank for making a frame for a fishing reel of the multiplier type, said blank being a hollow extruded aluminum section having a length corresponding to the width of the fishing reel frame to be made, said blank having an upstream end and a downstream end corresponding to opposite sides of a fishing reel, said upstream end and said downstream end both being open and having an interior periphery corresponding to the interior of said blank, said blank having inwardly and axially extending projections adapted to be converted to unitary fishing reel frame parts, said axially extending projections comprising:
    a first brace extending between said upstream end and said downstream end suitable for processing into a transverse fixing plate for a foot member;
    a grooved rib extending between said upstream end and said downstream end and suitable for processing into a transversely extending guide groove for a level wind mechanism; and
    a second brace extending between said upstream end and said downstream end and suitable for processing into a transversely extending thumb rest;
    said blank having surfaces suitable for anodizing.

* * * * *